United States Patent
Dyer

(10) Patent No.: US 9,993,016 B1
(45) Date of Patent: Jun. 12, 2018

(54) HANDS FREE FROZEN DRINK MIXING SYSTEMS

(71) Applicant: Alford Herman Dyer, Spring Valley, NY (US)

(72) Inventor: Alford Herman Dyer, Spring Valley, NY (US)

(*) Notice: Subject to any disclaimer, the term of this patent is extended or adjusted under 35 U.S.C. 154(b) by 296 days.

(21) Appl. No.: 15/135,178

(22) Filed: Apr. 21, 2016

Related U.S. Application Data

(63) Continuation-in-part of application No. 13/934,226, filed on Jul. 3, 2013, now abandoned.

(60) Provisional application No. 61/810,233, filed on Apr. 9, 2013.

(51) Int. Cl.
| | |
|---|---|
| *B01F 7/26* | (2006.01) |
| *A23G 9/22* | (2006.01) |
| *A23G 9/04* | (2006.01) |
| *A47J 43/044* | (2006.01) |

(52) U.S. Cl.
CPC ............ *A23G 9/224* (2013.01); *A23G 9/045* (2013.01); *A23G 9/228* (2013.01); *A47J 43/044* (2013.01); *A47J 2043/0449* (2013.01)

(58) Field of Classification Search
CPC ........ A23G 9/224; A23G 9/045; A23G 9/228; A47J 43/044; A47J 43/0711; A47J 2043/0449; A01B 12/006; B01F 9/12
See application file for complete search history.

(56) References Cited

U.S. PATENT DOCUMENTS

| | | | | |
|---|---|---|---|---|
| 1,946,840 A | * | 2/1934 | Cox ........................ | A47J 43/044 219/201 |
| 1,999,542 A | * | 4/1935 | Luxmore ............... | A47J 43/044 366/206 |
| 2,300,542 A | * | 11/1942 | Forse ..................... | B01F 7/1605 200/35 R |
| 2,626,133 A | * | 1/1953 | Reed ...................... | A23G 9/045 366/206 |
| 3,292,912 A | * | 12/1966 | Stubler .................. | A47J 43/044 366/197 |
| 3,379,416 A | * | 4/1968 | Smader .................. | A47J 43/044 366/206 |
| 4,339,639 A | * | 7/1982 | Valbona ................. | A47J 43/044 200/332.1 |
| 4,822,175 A | * | 4/1989 | Barnard .................. | B01F 13/04 366/206 |
| 5,323,691 A | * | 6/1994 | Reese ..................... | A23G 9/045 99/275 |

(Continued)

*Primary Examiner* — Steven Leff
(74) *Attorney, Agent, or Firm* — RB Patent Consulting, LLC; Rachel Gilboy

(57) ABSTRACT

A hands free frozen drink mixer system is a frozen drink mixing system of the immersion type that enables the user to automatically and hands-free blend ingredients for a frozen drink, add flavorings while blending, and automatically shut off the blender after a programmed interval of time. The hands free frozen drink mixer system may have a mixer assembly having an elevated motor supported by a back stand that integrally connects with a base having a drip basin and removable rack. A mixer shaft having a rotary blade assembly extends vertically downward from the front bottom side of the motor, and a canister holder that is adjustable in height via a vertical track holds a mixing canister. The canister is positioned over the base which has a removable drip tray.

20 Claims, 12 Drawing Sheets

(56) References Cited

U.S. PATENT DOCUMENTS

| | | | |
|---|---|---|---|
| 6,634,782 B2* | 10/2003 | Barton | A47J 43/082 366/142 |
| D559,611 S * | 1/2008 | Cheong | D7/306 |
| 7,780,338 B2* | 8/2010 | Olson | A47J 43/044 366/198 |
| 2003/0145734 A1* | 8/2003 | Ervin | A23G 9/045 99/275 |
| 2012/0087203 A1* | 4/2012 | Williams | B01F 7/161 366/138 |
| 2012/0204342 A1* | 8/2012 | Hotaling | A23G 9/045 4/625 |
| 2013/0265847 A1* | 10/2013 | Little | B01F 7/1605 366/286 |

* cited by examiner

HANDS FREE FROZEN DRINK MIXING SYSTEMS

CROSS-REFERENCE TO RELATED APPLICATION

The present application is related to and claims priority from prior provisional application Ser. No. 61/810,233, filed Apr. 9, 2013, and application Ser. No. 13/934,226, filed on Jul. 3, 2013, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of frozen drink mixers and more specifically relates to a hands free frozen drink mixer system.

2. DESCRIPTION OF THE RELATED ART

A blender is a kitchen or laboratory appliance used to mix, puree, or emulsify food and other substances. A stationary blender consists of a blender jar with a set of blades at the bottom, rotated by a motor in the base. The jar has a wide opening at the top with a cap and a smaller opening with a seal at the bottom to fit over the blades which are part of the blade assembly that attaches to the jar. The bottom exterior of the piece generally has some sort of coupling for attachment to the motor. The jar is most often proprietary and must be used with the blender system that it comes with. The addition of flavorings or additional ingredients must either be placed in the blender initially with the original ingredients or the blender must be stopped and the top removed to insert the ingredients, if done later. When food items are puréed, the contents of the jar is then poured into a second container and the blender jar is washed. The components of the jar can be disassembled for easier cleaning; however use of traditional blenders may be dangerous if not used properly.

Most blenders today have multiple speeds. As a typical blender has no gearbox, the multiple speeds are often implemented using a universal motor with multiple stator windings and/or multi-tapped stator windings; in a blender with electromechanical controls, the button (or other electrical switching device or position) for each different speed connects a different stator winding/tap or combination thereof. Each different combination of energized windings produces a different torque from the motor, which yields a different equilibrium speed in balance against the drag (resistance to rotation) of the blade assembly in contact with the material inside the food container. Typically the blade rotational speeds used in blenders are relatively high and require the user to stand by during the blending operation so as not to over blend the ingredients to produce an undesirable consistency. When blending frozen drinks, slower blending speeds are often more desirable and standard blenders can rotate too fast. Additionally, the user must remain focused on the operation which can be inefficient in some busy commercial applications such as ice cream shops or bars when the user must be proficient at multi-tasking. Immersion blenders are often preferred over standard blenders for creating frozen desserts or mixed drinks, but immersion blenders tend to be bulky and expensive. An inexpensive and more efficient, safe, hands-free blender is needed.

Various attempts have been made to solve the above-mentioned problems such as those found in U.S. Pat. Nos. 6,789,933; 5,323,691; and 7,942,094. This art is representative of frozen drink mixers. None of the above inventions and patents, taken either singly or in combination, is seen to describe the invention as claimed.

Ideally, a frozen drink mixer should provide multi-mode efficiency and, yet would operate reliably and be manufactured at a modest expense. Thus, a need exists for a reliable hands free frozen drink mixer system to 'hands-freely' and efficiently blend frozen drinks and to avoid the above-mentioned problems.

BRIEF SUMMARY OF THE INVENTION

In view of the foregoing disadvantages inherent in the known blending means art, the present invention provides a novel hands free frozen drink mixer system. The general purpose of the present invention, which will be described subsequently in greater detail, is to provide hands-free operation and efficiency in blending frozen drinks.

According to a preferred embodiment of the present invention, a hands free frozen drink mixing system may comprise a mixer assembly having a mixer housing with at least one motor encasement comprising at least one motor, a control panel, at least one mixer shaft receiver and at least one mixer shaft lock, a vertical back stand and a housing base having a drip tray, at least one mixer shaft, at least one rotary blade assembly comprising at least one rotary blade, a canister holder, a canister holder track, and a canister.

The motor encasement is integral with the mixer housing of the mixer assembly in preferred embodiments and is located at the upper portion of the mixer housing. The centerline of the motor is perpendicularly oriented to the vertical back stand and oriented parallel with the housing base. The motor preferably is a 110 volt alternating current motor, but may be 220 volts in some commercial applications. The vertical back stand may be integral with the mixer housing and supports the motor encasement above the vertical back stand. The vertical back stand is located at the backside of the mixer housing such that a space exists beneath the front-bottom side of the motor housing and above the top-front side of the drip tray for the canister holder and canister. The vertical back stand is about 2 inches in thickness and may have a variable width. The housing base may be integral with the mixer housing and provides a stable support for the vertical back stand and the motor encasement.

The mixer assembly is at least 12 inches high and at least 6 inches wide such that it is able to accommodate the canister which is able to hold a conventional-sized frozen drink. The motor is located within the interior area of the motor encasement. The control panel is preferably mounted to the flat front-face of the motor housing and is able to operatively control the rotational speed of the motor, as well as selecting automatic programs. The control panel further may comprise a low speed control, a medium speed control, a high speed control, and an automatic operation control. The mixer assembly may comprise a power switch such that the mixer assembly is able to be powered on and to be turned off to control relative rotation of the rotary blades. The automatic mode may have a pre-programmed rotational speed and operate the motor for a user programmed interval of time.

The mixer shaft receiver is vertically attached to the front-bottom side of the motor housing and is in communication with the motor so that rotation of the motor also rotates the mixer shaft. The mixer assembly may comprise a right angle drive for converting the motor direction of rotation about 90 degrees to operatively rotate the mixer shaft with the rotary blade assembly within the canister to blend the ingredients. The mixer shaft may be also in communication with at least one reservoir in the mixer housing that has an interior-channel and apertures that are able to deliver flavoring from the reservoir(s) to intermix with the ingredients while being blended. The mixer shaft lock is coupled to the mixer shaft receiver such that the mixer shaft is able to be inserted into the mixer shaft receiver and removably locked into communication with the mixer shaft receiver. The at least one rotary blade assembly comprising at least one rotary blade is non-removably attached to the lower end of the mixer shaft. The mixer assembly may comprise more than one motor, more than one mixer shaft receiver, more than one mixer shaft lock, and more than one mixer shaft having a rotary blade assembly in commercial applications, so that more than one frozen drink can be made (stirred) at the same time (simultaneously).

The drip tray is nestably located within the housing base. The drip tray may have a removable rack, in preferred embodiments, that is coplanar with the housing base and nestibly rests within the housing base such that the top edge of the removable rack is flush with the top surface of the housing base. The removable rack preferably comprises perforations so that liquid that is dripped from the canister is able to drain through the removable rack into a catch basin in the drip tray.

The canister holder is slideably attached to the canister holder track such that the canister holder is able to be slideably raised and slideably lowered. The canister holder track comprises a vertical slot through the mixer housing such that a horizontal bar attached to the canister holder is able to attach the canister holder on the exterior of the mixer housing to a guide on the interior of the mixer housing so that the guide is able to move vertically up and vertically down within the slot. The vertical slot of the canister holder track preferably comprises an inverted S-shape near a bottom of the slot. The canister is able to be removably coupled to the canister holder and locked into place for hands-free operation. The mixer assembly comprises a smart switch that is able to be activated by the canister placed in the canister holder, the smart switch activating a user preferred pre-programmed mode when the mixer assembly is in the automatic mode. The mixer assembly is useful for placing ingredient(s) to be blended within the canister and coupling the canister with the ingredients to the canister holder such that the rotary blade assembly is positioned within the ingredients, and hands free blending the ingredients to produce at least one partially frozen drink.

The hands free frozen drink mixing system may comprise a kit having at least one mixer assembly having at least one mixer shaft with a rotary blade assembly, at least one canister, and at least one set of user instructions. A method of using the hands free frozen drink mixing system may comprise the steps of inserting the ingredients to be blended into the canister of the mixer assembly, coupling the canister to the canister holder of the mixer assembly, pressing the power button to activate a hands free mixing operation, pressing a button to inject flavoring into the ingredients during the blending of the ingredients, pouring the blended ingredients into a separate glass, pouring heated water and soap into the canister, coupling the canister to the canister holder and activating the hands free mixing operation to clean the canister, and storing the canister for future use.

Furthermore, each canister can be covered by a cap member adapted to be releasably secured upon an upper rim thereof. The mixer shaft can further include a cap sensor adapted to sense a cap placed upon a canister to be used, such that the motor and mixer shaft can be controlled such that only when the cap is on the canister can the motor can be activated. Furthermore the mixer shaft can include a heating element adapted to heat a drink inside the canister and sense and measure its temperature for further adjustments via controls inside the mixer. Therefore, the temperature of the drink and the motor speed can be controlled according to predetermined values.

The present invention holds significant improvements and serves as a hands free frozen drink mixer system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, hands free frozen drink mixer system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a blender device, and more particularly, to a hands free frozen drink mixer system as used to improve the hands-free and efficiency in safely making blended, frozen drinks.

Generally speaking, a hands free frozen drink mixer system is a frozen drink mixing system of the immersion type that enables the user to automatically and hands-free blend ingredients for a frozen drink, add flavorings while blending, and automatically shut off after the programmed interval of time. The hands free frozen drink mixer system may comprise a mixer assembly having an elevated motor supported by a back stand that integrally connects with a base having a drip basin. A mixer shaft having a rotary blade assembly extends vertically downward from the front bottom side of the motor, and a canister holder that is adjustable in height via a vertical track holds the mixing canister. The canister is positioned over the drip basin of the base which has a removable drip rack.

Figure 1:
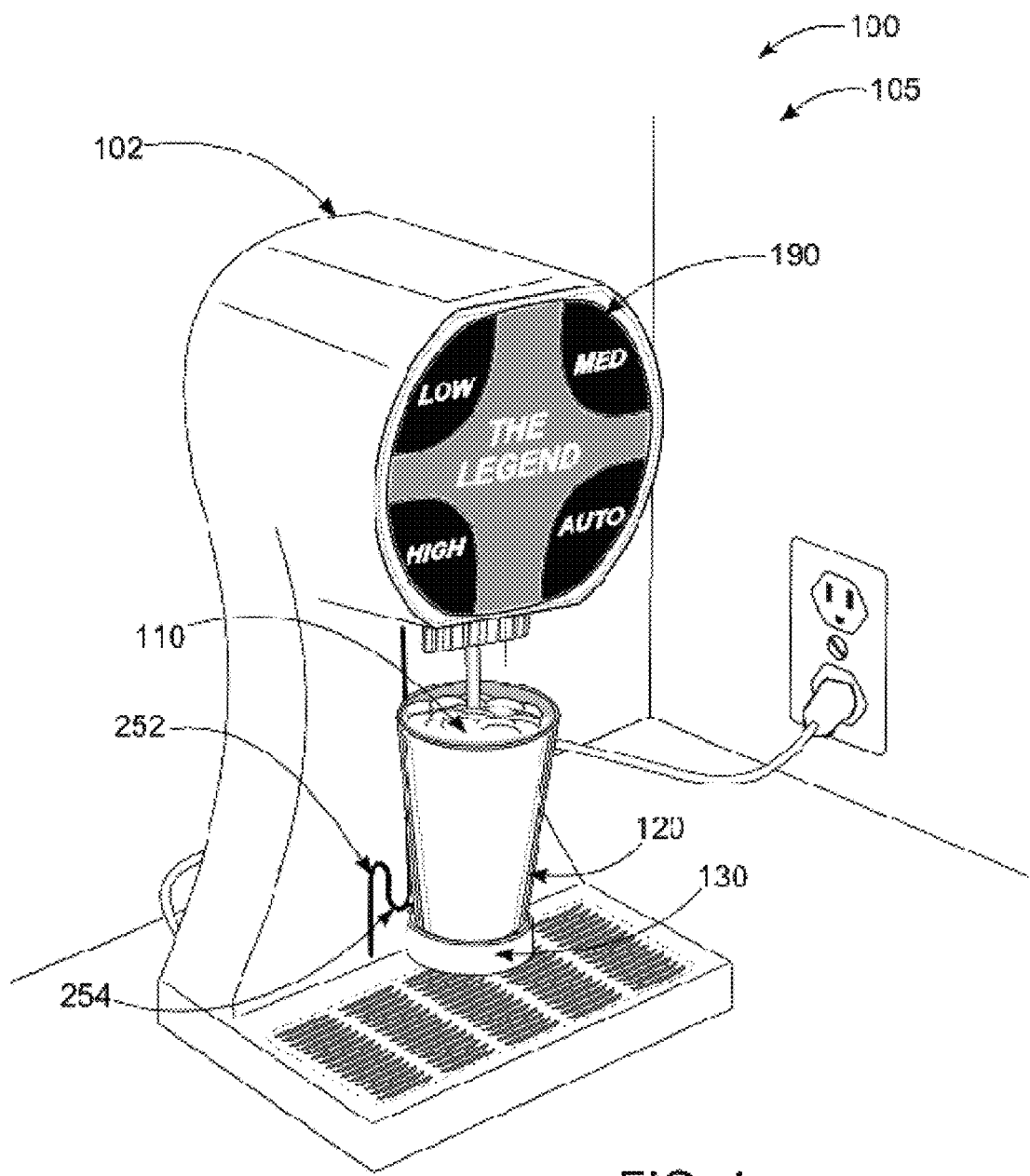
FIG. 1 shows a perspective view illustrating an in-use condition of a hands free frozen drink mixer system according to an embodiment of the present invention.

In greater detail, referring to the drawings by numerals of reference, there is shown in FIG. 1, a perspective view illustrating an in-use condition of hands free frozen drink mixer system 100 according to an embodiment of the present invention.

Mixer assembly 105 is useful for placing ingredient(s) 110 to be blended within canister 120 and then coupling canister 120 with ingredient(s) 110 inside to canister holder 130 such that rotary blade assembly 140 is positioned within ingredient(s) 110, for hands free blending of ingredient(s) 110 to produce at least one partially frozen drink. Mixer assembly 105 may be used for foods but is particularly suited for frozen drinks such as various ice cream drinks or frozen cocktails. Cocktails and blended ice cream drinks having flavors added to ingredient(s) 110 typically have an optimal blending time to achieve a desired consistency of the frozen drink. Mixer assembly 105 is able to be programmed to a user preferred time and speed setting when used in the automatic mode, and the device will turn off automatically after the interval of blending time has been reached, allowing the user to perform other tasks until the blending is complete. Alternate embodiments may have a two station or three station mixer assembly 105 having the ability to mix two or three drinks simultaneously in busy commercial settings.

Figure 2:
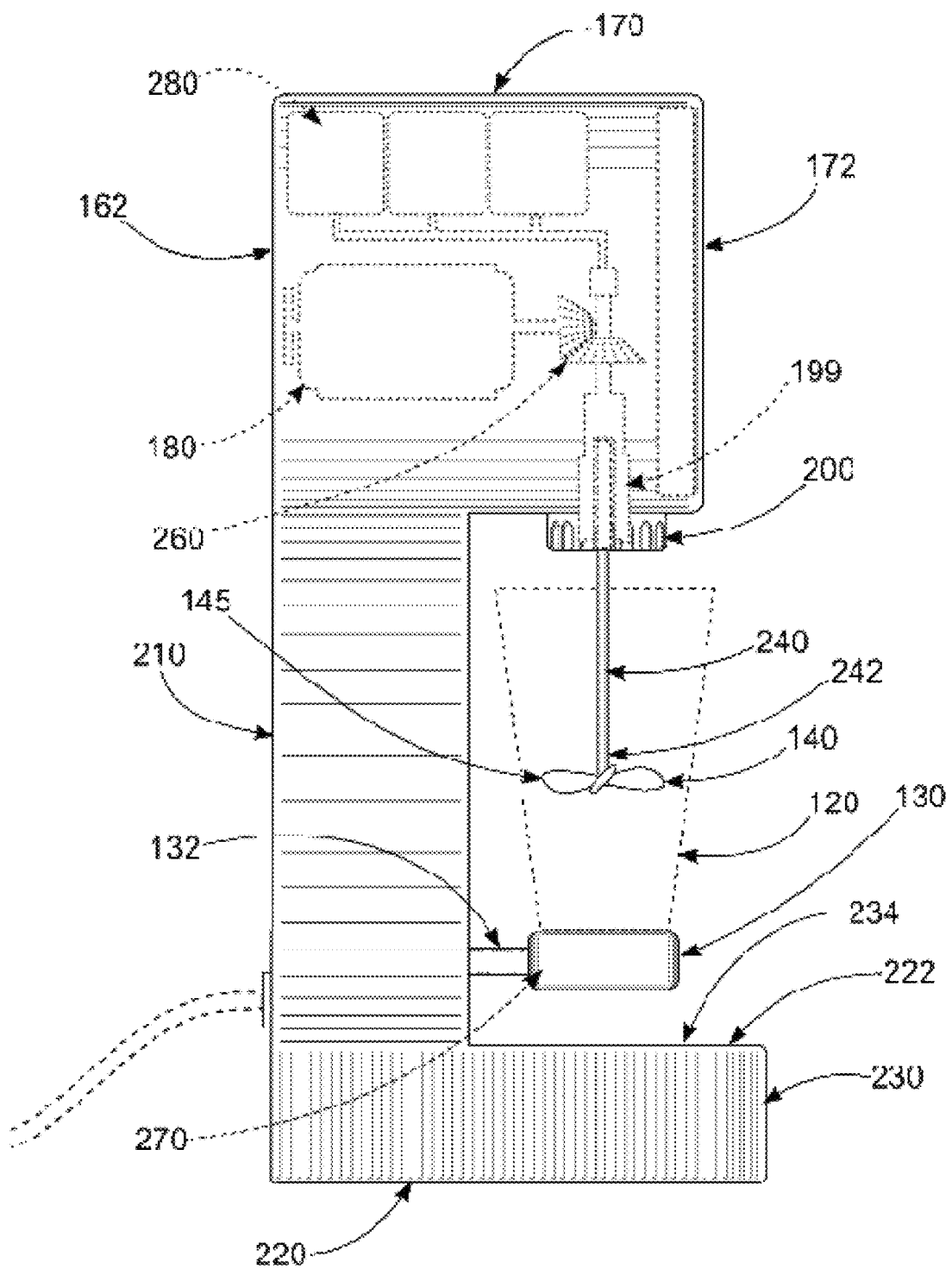
FIG. 2 is a left side view of the hands free frozen drink mixer system according to an embodiment of the present invention of FIG. 1.

Referring now to FIG. 2, a perspective view illustrating a left side of hands free frozen drink mixer system 100 according to an embodiment of the present invention of FIG. 1.

According to a preferred embodiment of the present invention, hands free frozen drink mixer system 100 may comprise mixer assembly 105 having mixer housing 160 with at least one motor encasement 170 comprising at least one motor 180, control panel 190, at least one mixer shaft receiver 199 and at least one mixer shaft lock 200, vertical back stand 210 and housing base 220 having drip tray 230, at least one mixer shaft 240, at least one rotary blade assembly 140 comprising at least one rotary blade 145, canister holder 130, canister holder track 250, and canister 120. Motor encasement 170 is integral with mixer housing 160 of mixer assembly 105 and is located at upper portion 162 of mixer housing 160. The centerline of motor 180 is perpendicularly oriented to vertical back stand 210 and oriented parallel with housing base 220. Mixer shaft lock 200 is coupled to mixer shaft receiver 199 such that mixer shaft 240 is able to be inserted into mixer shaft receiver 199 and removably locked into communication with mixer shaft receiver 199.

Figure 3:
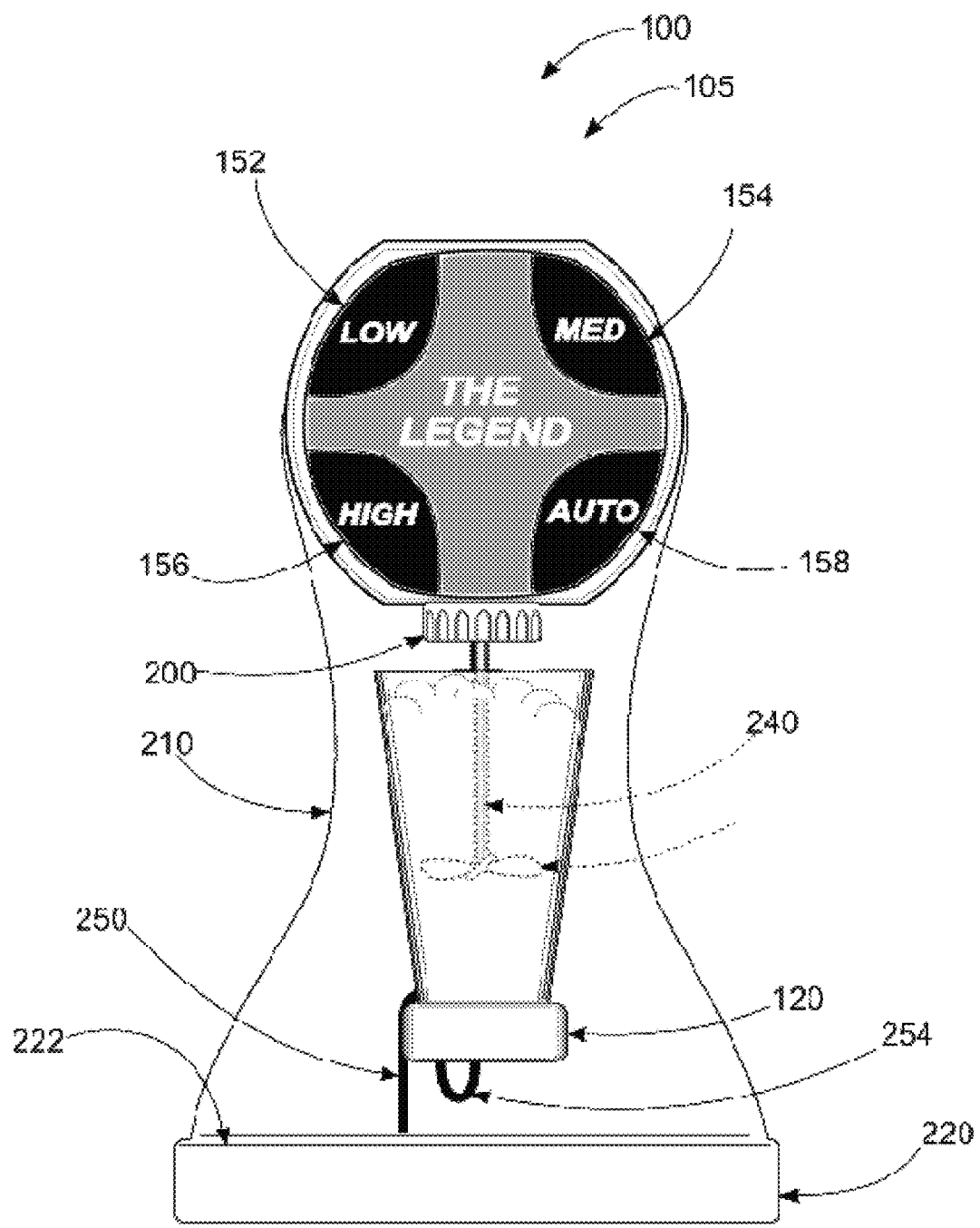
FIG. 3 is a perspective view illustrating a front side of the hands free frozen drink mixer system according to an embodiment of the present invention of FIG. 1.

Referring now to FIG. 3, a perspective view illustrating a front side of hands free frozen drink mixer system 100 according to an embodiment of the present invention of FIG. 1.

Control panel 190 is mounted to flat front-face 172 of motor encasement 170 and is able to operatively control rotational speed of motor 180. Control panel 190 further may comprise low speed control 152, medium speed control 154, high speed control 156, and automatic operation control 158. Mixer assembly 105 may comprise a power switch such that mixer assembly 105 is able to be powered on and to be turned off to control rotation of rotary blade(s) 145. The automatic mode may have a pre-programmed rotational speed and operate motor 180 for a user programmed interval of time. Mixer shaft receiver 199 is vertically attached to front-bottom side 150 of motor encasement 170 and is in communication with motor 180 so that a rotation of motor 180 also rotates mixer shaft 240.

Mixer assembly 105 may comprise right angle drive 260 for converting motor 180 direction of rotation about 90 degrees to operatively rotate mixer shaft 240 with rotary blade assembly 140 within canister 120 to blend ingredients. At least one rotary blade assembly 140 comprising at least rotary blade(s) 145 is non-removably attached to lower end 242 of mixer shaft 240. Mixer assembly 105 may comprise more than one motor 180, more than one mixer shaft receiver 199, more than one mixer shaft lock 200, and more than one mixer shaft 240 having rotary blade assembly 140 in commercial applications, so that more than one frozen drink can be made at the same time.

Canister holder 130 is slideably attached to canister holder track 250 such that canister holder 130 is able to be slideably raised and slideably lowered. Canister holder track 250 comprises vertical slot 252 through mixer housing 160 such that horizontal bar 132 attached to canister holder 130 is able to attach canister holder 130 on the exterior of mixer housing 160 to a guide on the interior of mixer housing 160 such that the guide is able to move vertically up and vertically down within vertical slot 252. Vertical slot 252 of canister holder track 250 comprises an inverted S-shape 254 near the bottom of vertical slot 252. Canister 120 is able to be removably coupled to canister holder 130. Mixer assembly 105 comprises smart switch 270 that is able to be activated by canister 120 placed into canister holder 130, smart switch 270 activating a user preferred, pre-programmed mode when mixer assembly 105 is in automatic mode.

Figure 4:
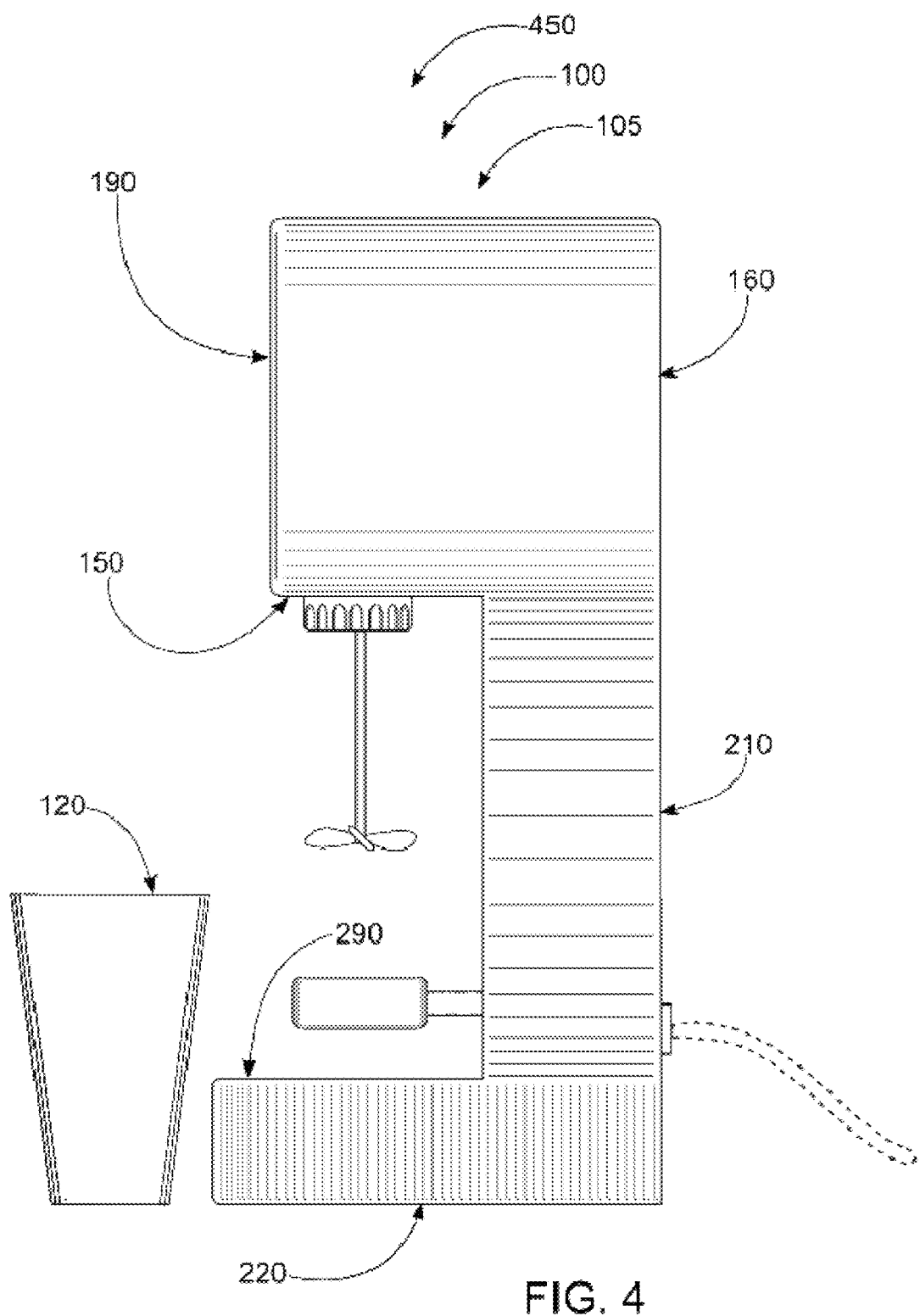
FIG. 4 is a perspective view illustrating a right side of the hands free frozen drink mixer system according to an embodiment of the present invention of FIG. 1.

Referring now to FIG. 4, a perspective view illustrating a right side of hands free frozen drink mixer system 100 according to an embodiment of the present invention of FIG. 1.

Vertical back stand 210 is about 2 inches in thickness and may have a variable width. Housing base 220 may be integral with mixer housing 160 and provides a stable support for vertical back stand 210 and motor encasement 170. Mixer assembly 105 is at least 12 inches high and at least 6 inches wide such that it is able to accommodate canister 120 which is able to hold a conventional-sized frozen drink. Motor 180 is located within the interior of motor encasement 170. Mixer shaft 240 may be also in communication with reservoir(s) 280 in mixer housing 160 that has an interior-channel and apertures able to deliver a flavoring from reservoir(s) 280 to intermix with ingredient(s) 110 while being rotated.

Figure 5:
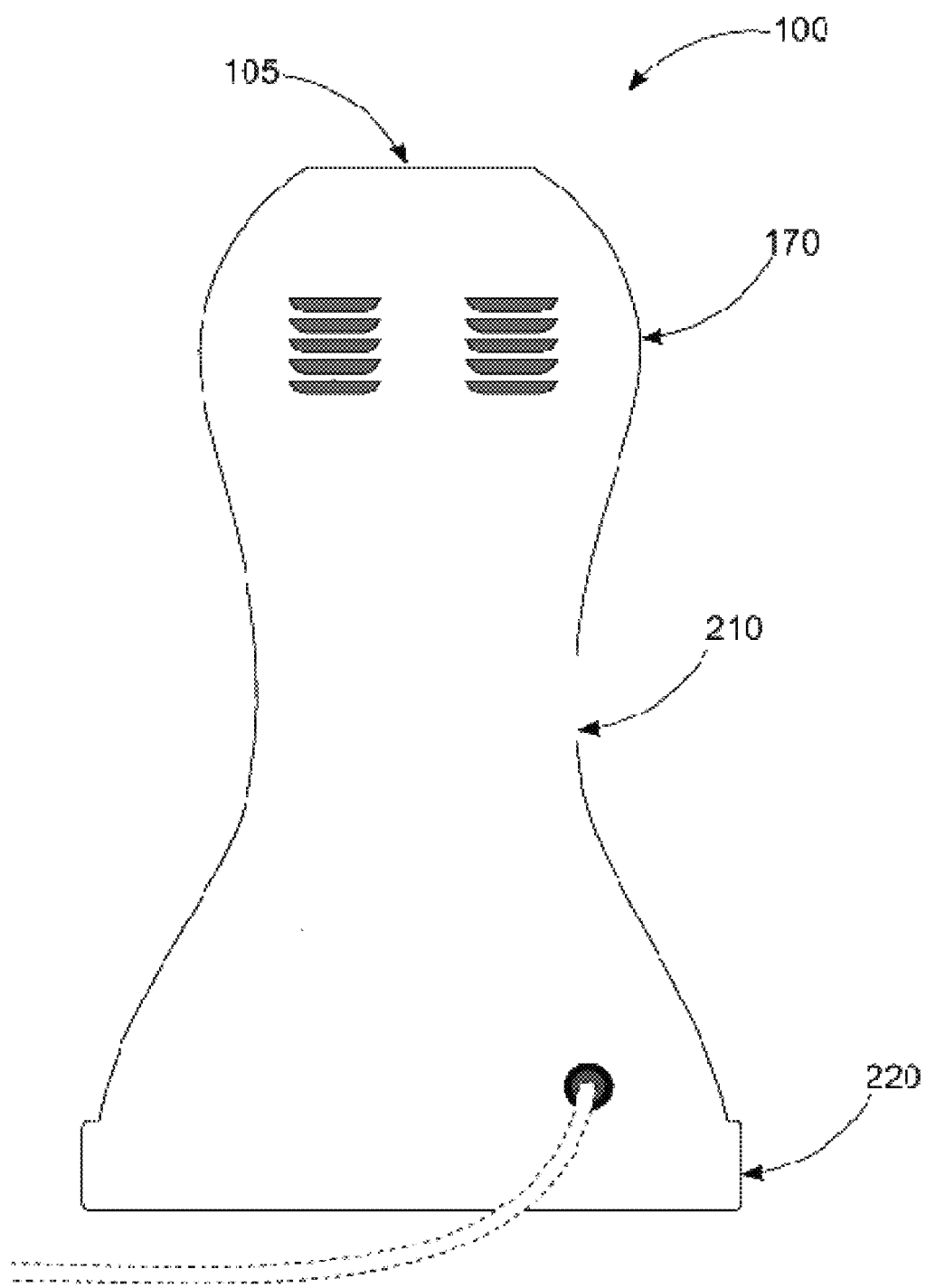
FIG. 5 is a perspective view illustrating a back side of the hands free frozen drink mixer system according to an embodiment of the present invention of FIG. 1.

Referring now to FIG. 5, a perspective view illustrating a back side of hands free frozen drink mixer system 100 according to an embodiment of the present invention of FIG. 1.

Motor 180 is preferably a 110 volt alternating current motor 180, but other embodiments may have different voltage motor(s) 180 as needed for different applications. A multi-station mixer assembly 105 used in commercial applications may have a 220 volt alternating current motor 180. Vertical back stand 210 may be integral with mixer housing 160 and supports motor encasement 170 above vertical back stand 210. Vertical back stand 210 is located at the backside of mixer housing 160 such that a space exists beneath front-bottom side 150 of motor encasement 170 and above top-front side 290 of drip tray 230 for canister holder 130 and canister 120.

Figure 6:
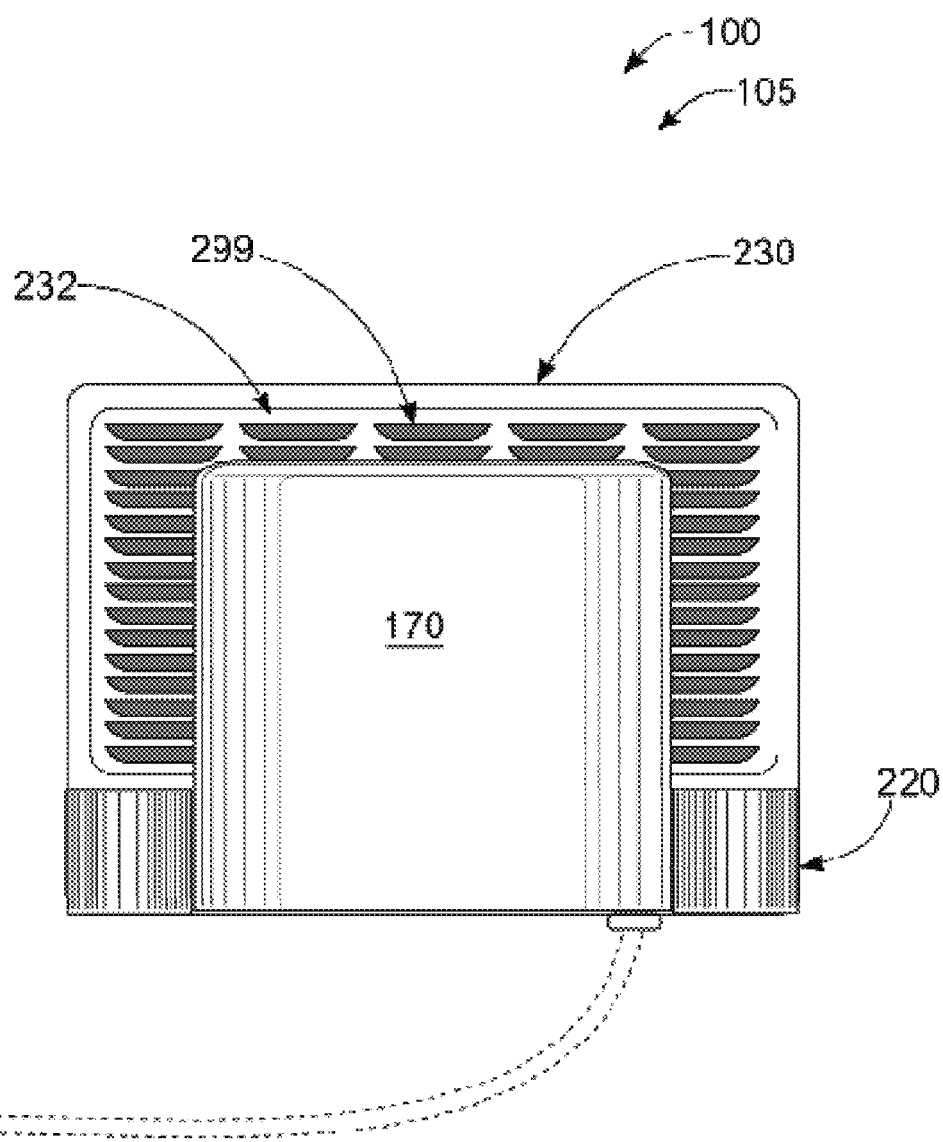
FIG. 6 is an overhead view illustrating the hands free frozen drink mixer system according to an embodiment of the present invention of FIG. 1.

Referring now to FIG. 6, is an overhead view illustrating hands free frozen drink mixer system 100 according to an embodiment of the present invention of FIG. 1.

Drip tray 230 is nestably located within housing base 220. Drip tray 230 may have removable rack 232, in preferred embodiments that is coplanar and nestibly rests within housing base 220 such that top edge 234 of removable rack 232 is flush with top surface 222 of housing base 220. Removable rack 232 preferably comprises perforations 299 so that liquid that is dripped from canister 120 is able to drain through removable rack 232 into a catch basin in drip tray 230.

Hands free frozen drink mixer system 100 may be sold as kit 450 comprising the following parts: at least one mixer assembly 105 having at least one mixer shaft 240 with rotary blade assembly 140; at least one canister 120; and at least one set of user instructions. Hands free frozen drink mixer system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different motor/drive/mixer/canister combinations, parts may be sold separately, etc., may be sufficient.

Figure 7:
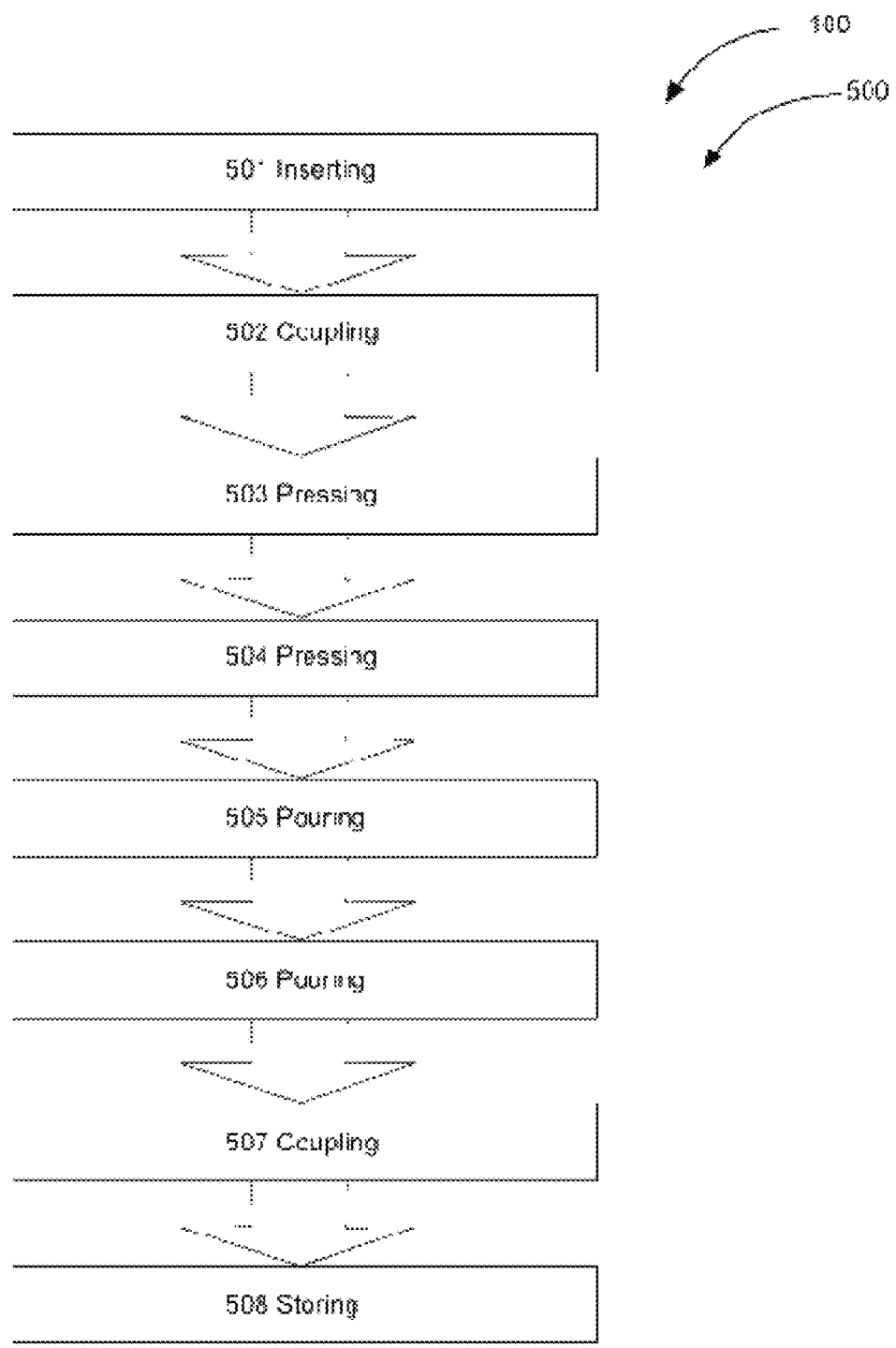
FIG. 7 is a flowchart illustrating a method of use for the hands free frozen drink mixer system according to an embodiment of the present invention of FIGS. 1-6.
Figure 8:
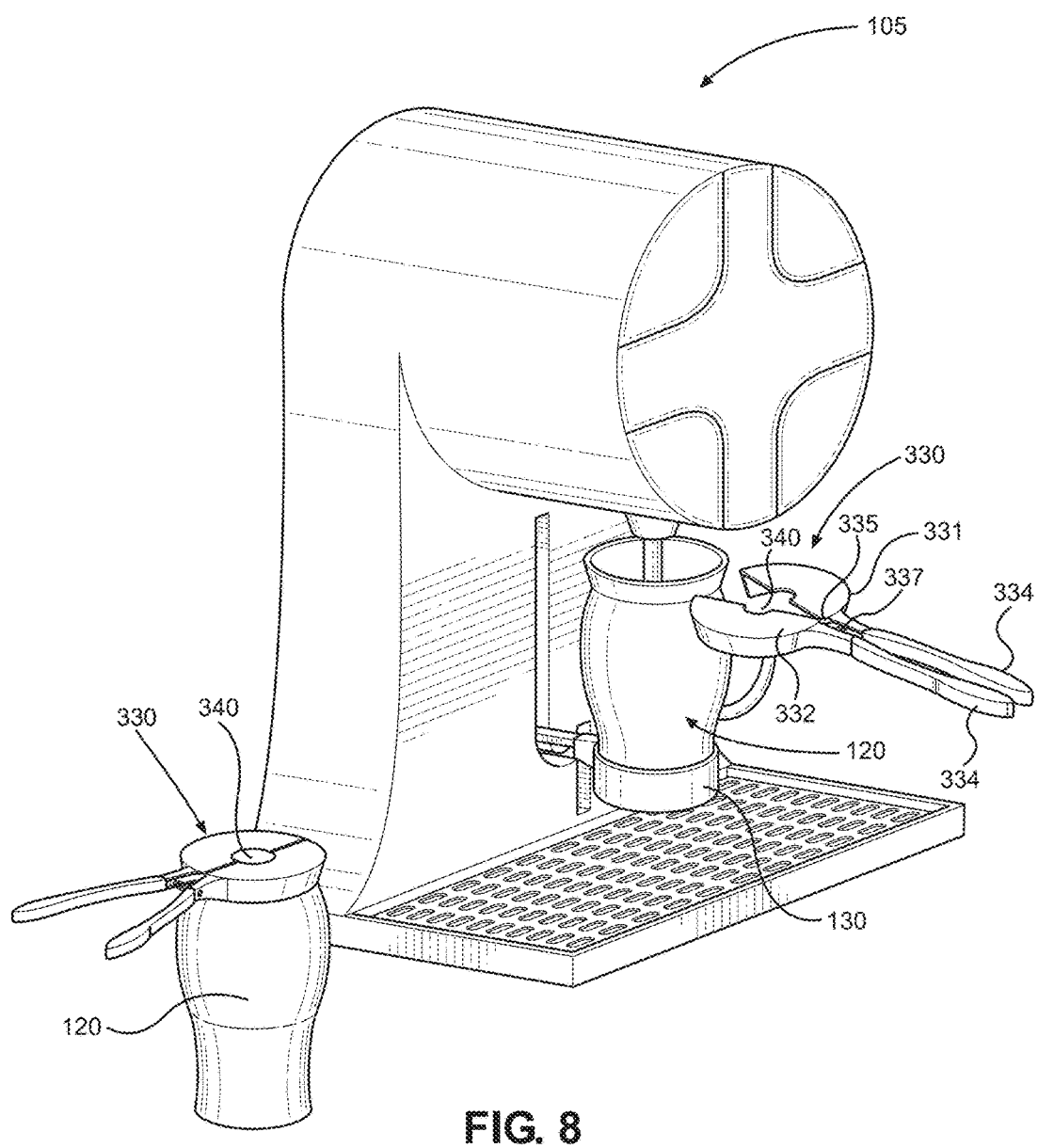
FIGS. 8 & 9 show perspective views illustrating the use of removable caps upon the canisters before and during use.
Figure 9:
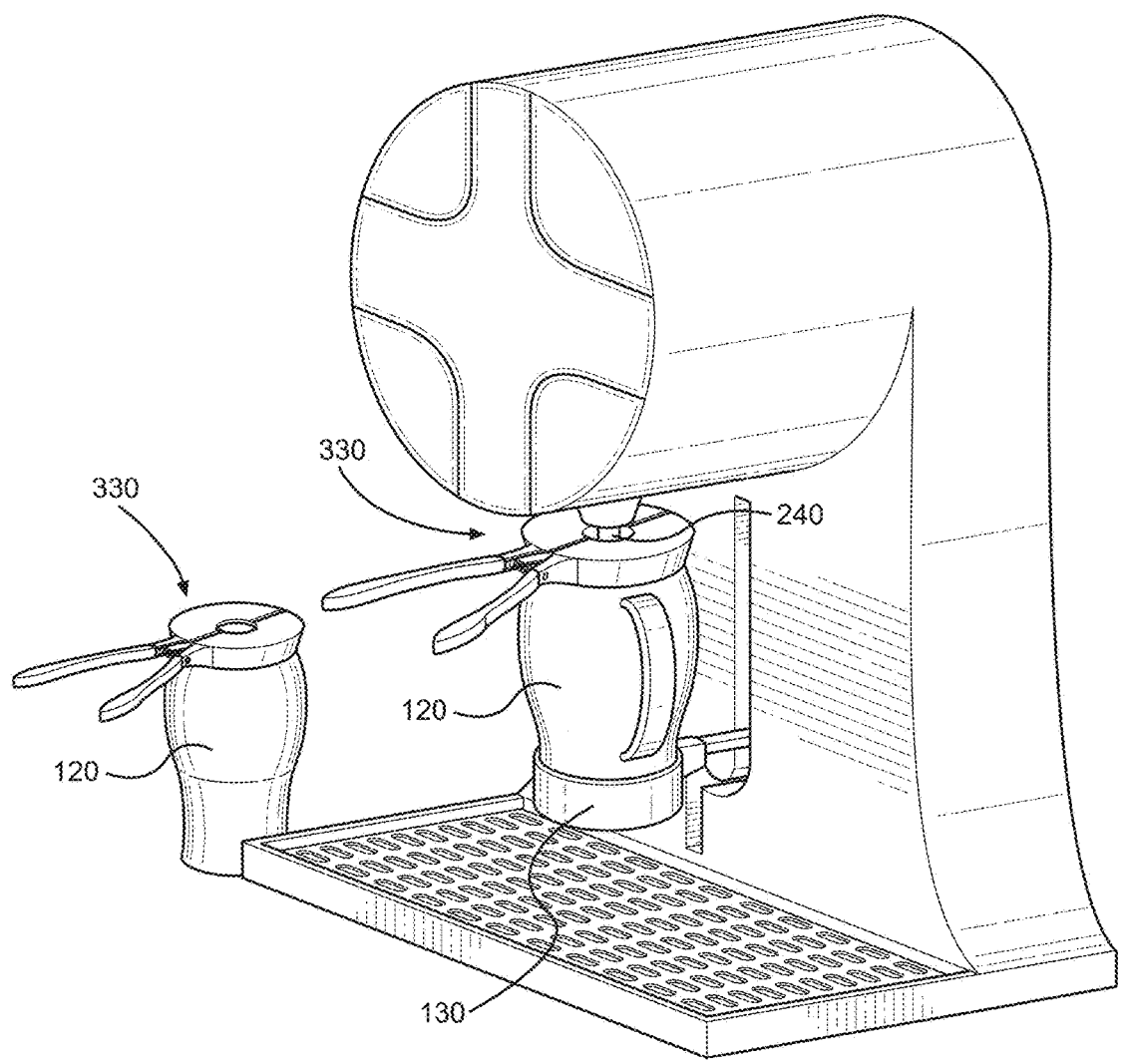
Figure 10:
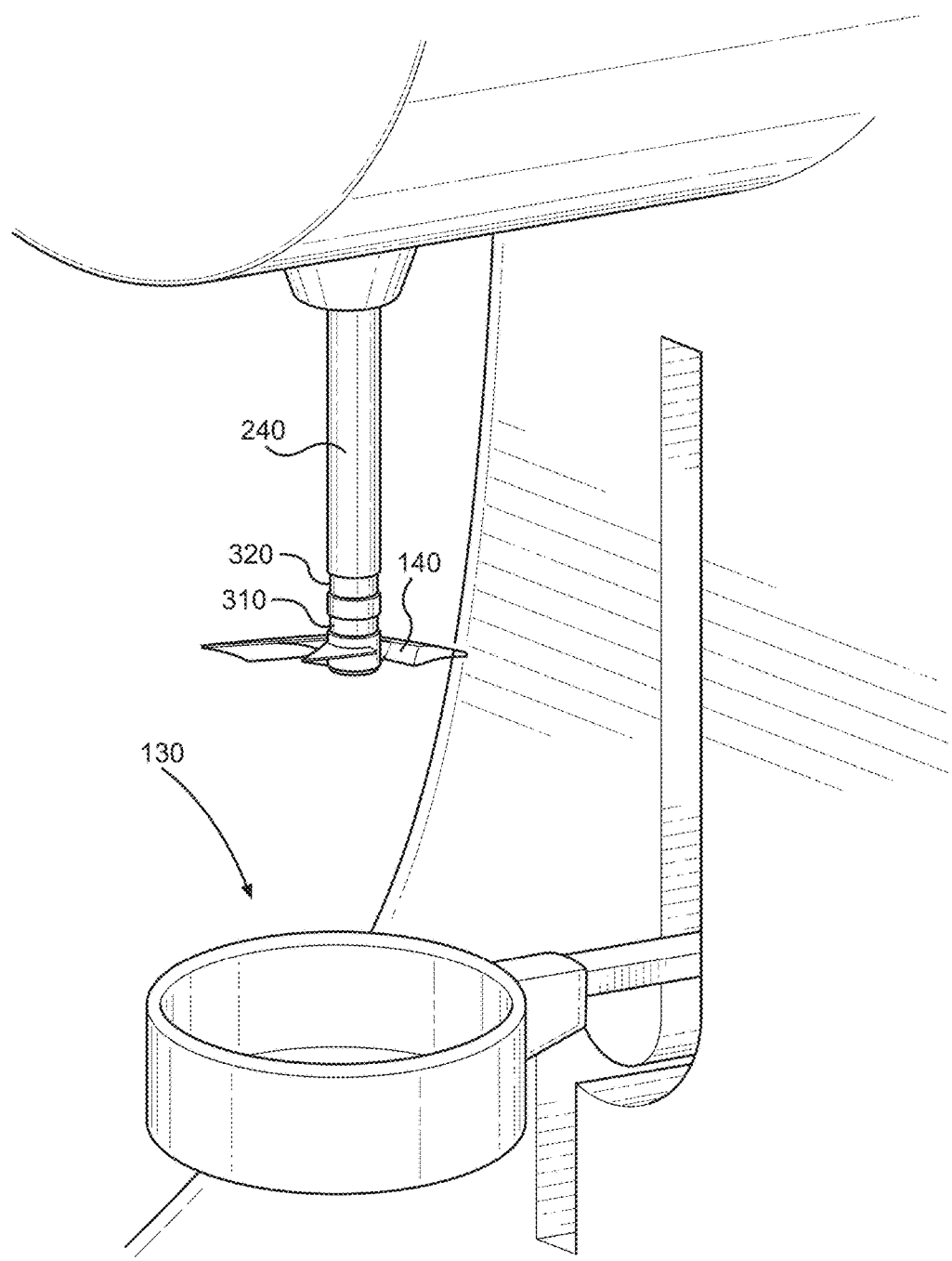
FIG. 10 shows a perspective view illustrating a cap sensor and a heating element located on the mixer shaft of the mixer.
Figure 11:
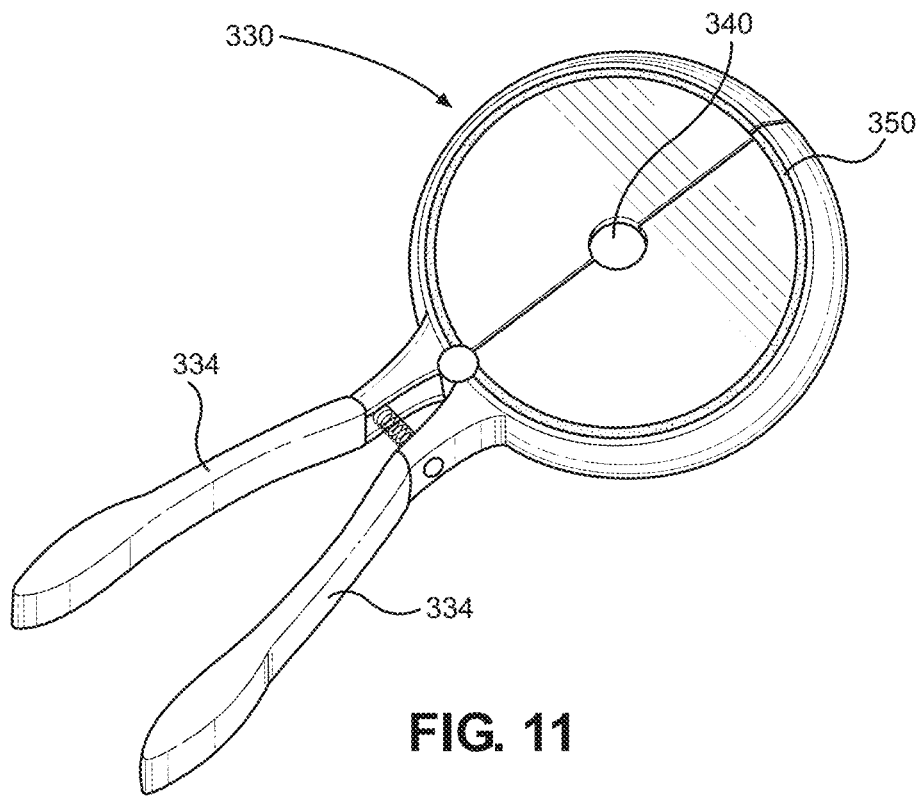
FIG. 11 shows a perspective view of a cap in a closed configuration.
Figure 12:
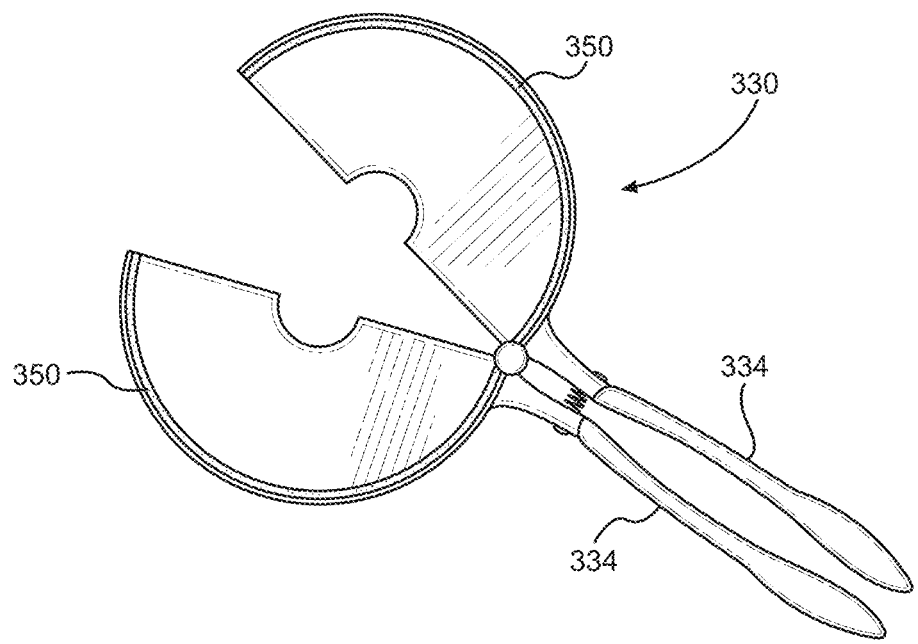
FIG. 12 shows a top view illustrating of a cap in an open configuration.
Figure 13:
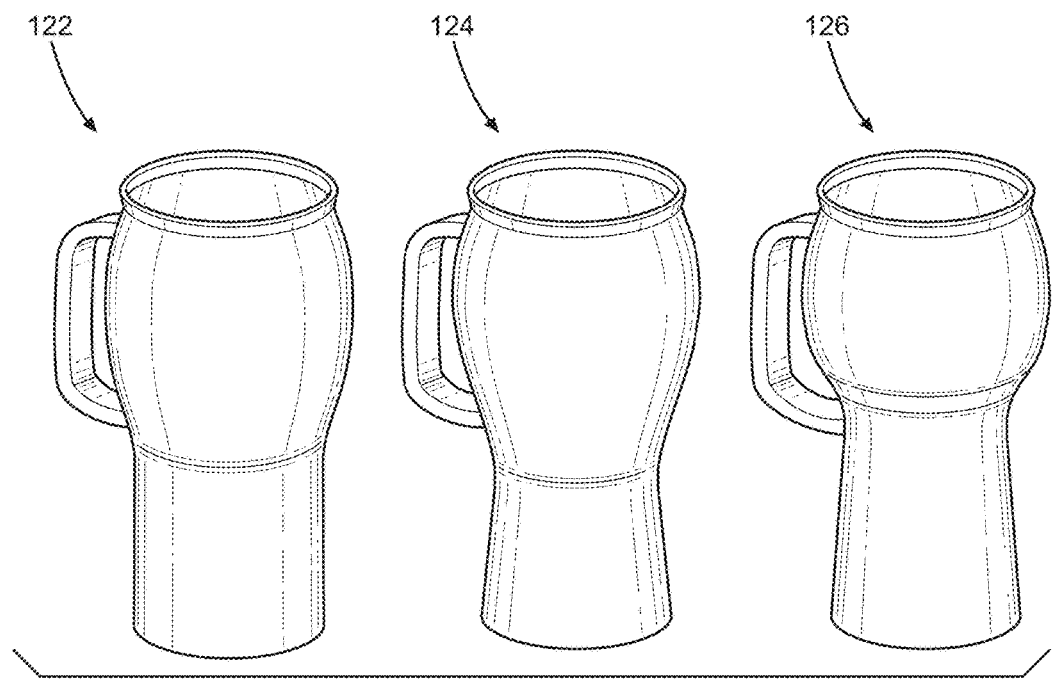
FIG. 13 shows a perspective view of three different canisters.

Referring now to FIG. 7, a flow chart illustrating method of use 500 for hands free frozen drink mixer system 100. Method of use 500 for hands free frozen drink mixer system 100 may comprise the steps of: step one 501 inserting ingredient(s) 110 to be blended into canister 120 of mixer assembly 105; step two 502 coupling canister 120 to canister holder 130 of mixer assembly 105; step three 503 pressing the power button to activate a hands free mixing operation; step four 504 pressing a button to inject flavoring into ingredient(s) 110 during the blending of ingredient(s) 110; step five 505 pouring the blended ingredient(s) 110 into a separate glass; step six 506 pouring heated water and soap into canister 120; step seven 507 coupling canister 120 to canister holder 130 and activating a hands free mixing operation to clean canister 120; and step eight 508 storing canister 120 for future use.

It should be noted that step 504 is an optional step and may not be implemented in all cases. Optional steps of method 500 are illustrated using dotted lines in FIG. 5 so as to distinguish them from the other steps of method 500.

Referring to FIGS. 8-13 each canister 120 can be covered by a cap member 330 adapted to be releasably secured upon an upper rim thereof and include an aperture 340 through a center portion that is sized and adapted to be placed around and contact the mixer shaft 240. Further, the mixer shaft 240 can further include a heating element 310 and a cap sensor 320. The cap member 330 can comprise two halves pivotally connected together at a pivot point via a spring member, wherein each of the two halves includes a handle portion 334, such that the cap member can be pivoted by hand to an open position and placed around the mixer shaft 240, contact the cap sensor 320, and placed upon the upper rim of the canister, and then closed via the force of the spring member and be frictionally retained upon the upper rim member of the canister during use. The heating element 310 is adapted to heat the drink inside the canister and sense and measure its temperature for further adjustments via controls inside the mixer. The cap sensor 320 is adapted to sense a cap placed upon a canister to be used, such that the motor and mixer shaft 240 is controlled by the cap sensor 320 and is adapted such that only when the cap is on the canister can the motor can be activated. Therefore, the temperature of the drink and the motor speed can be controlled according to predetermined values.

The cap member 330 further includes a rubber seal member 350 connected around an inner rim thereof and is adapted to form a seal between the cap member and the canister upper rim to prevent any of the drink from escaping the canister when the motor is activated. Furthermore, the canister 120 and cap member 330 can be formed from a metallic material, or a ceramic material, or any other material known in the art.

The canister 120 can be formed as three different canisters for differing uses, including a blending canister 122, a mixing canister 124, and a chopping canister 126.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A hands free frozen drink mixing system comprising:
   a mixer assembly comprising;
      a mixer housing having;
         at least one motor encasement comprising;
            at least one motor;
            a control panel;
            at least one mixer shaft receiver; and
            at least one mixer shaft lock;
         a vertical back stand; and
         a housing base having;
            a drip tray;
      at least one mixer shaft;
      at least one rotary blade assembly comprising at least one rotary blade;
      a canister holder;
      a canister holder track; and
      a canister;
   wherein said at least one motor encasement is integral with said mixer housing of said mixer assembly and is located at an upper portion of said mixer housing;
   wherein said vertical back stand is integral with said mixer housing and supports said at least one motor encasement vertically above said vertical back stand;
   wherein said housing base is integral with said mixer housing and provides a stable support for said vertical back stand and said at least one motor encasement;
   wherein said at least one motor is located within an interior of said at least one motor encasement;
   wherein said control panel is mounted to a flat front-face of said motor housing, said control panel able to operatively control a rotational speed of said at least one motor;
   wherein said at least one mixer shaft receiver is vertically attached to a front-bottom side of said motor housing such that said mixer shaft receiver is in communication with said motor;
   wherein said at least one mixer shaft lock is coupled to said mixer shaft receiver such that said at least one mixer shaft is able to be inserted into said mixer shaft receiver and removably locked into communication with said mixer shaft receiver;
   wherein said at least one rotary blade assembly comprising said at least one rotary blade is non-removably attached to a lower end of said at least one mixer shaft;
   wherein said drip tray is nestably located within said housing base;
   wherein said canister holder is slideably attached to said canister holder track such that said canister holder is able to be slideably raised and slideably lowered;
   wherein said canister is able to be removably coupled to said canister holder; and
   wherein said mixer assembly is useful for placing an ingredient(s) to be blended within said canister and coupling said canister with said ingredients therein to said canister holder such that said rotary blade assembly is positioned within said ingredients, and hands free blending said ingredients to produce at least one partially frozen drink;
   wherein said canister holder track comprises a vertical slot through said mixer housing such that a horizontal bar attached to said canister holder is able to attach said canister holder on an exterior of said mixer housing to a guide on said interior of said mixer housing such that said guide is able to move vertically up and vertically down within said slot;
   wherein said vertical slot of said canister holder track comprises an inverted S-shape near a bottom of said slot.

2. The hands free frozen drink mixing system of claim 1 wherein a centerline of said motor is perpendicularly oriented to said vertical back stand and wherein said centerline of said motor is oriented parallel with said housing base.

3. The hands free frozen drink mixing system of claim 2 wherein said vertical back stand is about 2 inches in thickness and comprises a variable width.

4. The hands free frozen drink mixing system of claim 3 wherein said vertical back stand is located at a backside of said mixer housing such that a space exists beneath said front-bottom side of said motor housing and above a top-front side of said drip tray.

5. The hands free frozen drink mixing system of claim 1 wherein said control panel further comprising a low speed control, a medium speed control, a high speed control, and an automatic operation control.

6. The hands free frozen drink mixing system of claim 1 wherein said drip tray further comprises a removable rack, said removable rack is coplanar with said housing base and nestibly rests within said housing base such that said top edge of said removable rack is flush with said top surface of said housing base.

7. The hands free frozen drink mixing system of claim 6 wherein said removable rack comprises perforations such that a liquid that is dripped from said canister is able to drain through said removable rack into a catch basin in said drip tray.

8. The hands free frozen drink mixing system of claim 1 wherein said mixer assembly is at least 12 inches high and at least 6 inches wide such that it is able to accommodate said canister, said canister able to hold a conventional-sized milkshake.

9. The hands free frozen drink mixing system of claim 8 wherein said mixer assembly comprises a smart switch that is able to be activated by said canister placed in said canister holder, said smart switch activating a user preferred pre-programmed mode when said mixer assembly is in said automatic mode.

10. The hands free frozen drink mixing system of claim 9 wherein said user preferred pre-programmed mode rotationally operates said motor for a user preferred interval of time.

11. The hands free frozen drink mixing system of claim 10 wherein said motor comprises 110 volts alternating current.

12. The hands free frozen drink mixing system of claim 1 wherein said at least one mixer shaft is in communication with a at least one reservoir in said mixer housing and said at least one mixer shaft comprises an interior-channel and apertures able to deliver a flavoring from said at least one reservoir to intermix with said ingredients when rotated.

13. The hands free frozen drink mixing system of claim 1 wherein said mixer assembly comprises a power switch such that said mixer assembly is able to be powered on and to be turned off to control rotation of said rotary blade.

14. The hands free frozen drink mixing system of claim 1 wherein said mixer assembly comprises more than one motor, more than one mixer shaft receiver, more than one mixer shaft lock, and more than one mixer shaft having said rotary blade assembly.

15. The hands free frozen drink mixing system of claim 14 wherein said mixer assembly comprises a right angle drive for converting a motor direction of rotation about 90 degrees to operatively rotate said mixer shaft having said rotary blade assembly within said canister having said ingredients to be blended.

16. A drink mixing system comprising:
   a mixer assembly comprising;
      a mixer housing having;
         at least one motor encasement comprising;
            at least one motor adapted to be run at various speeds;
            a control panel;
            at least one mixer shaft receiver; and
            at least one mixer shaft lock;
         a vertical back stand; and
         a housing base having;
            a drip tray;
      a mixer shaft including;
         a heating element and sensor adapted to heat said drink and to sense and measure the temperature of said drink, such that said temperature of said drink and said motor speed can be controlled according to predetermined values; and
         a cap sensor adapted to sense a cap upon a canister to be used, such that said motor is controlled by said cap sensor and is adapted such that only when said cap is on said canister can said motor can be activated;
      at least one rotary blade assembly comprising at least one rotary blade;
      a canister holder;
      a canister holder track; and
      at least one canister including;
         a cap member adapted to be releasably secured upon an upper rim thereof and includes an aperture through a center portion sized and adapted to be placed around said mixer shaft and contact said cap sensor of said mixer shaft;
   wherein said at least one motor encasement is integral with said mixer housing of said mixer assembly and is located at an upper portion of said mixer housing;
   wherein said vertical back stand is integral with said mixer housing and supports said at least one motor encasement vertically above said vertical back stand;
   wherein said housing base is integral with said mixer housing and provides a stable support for said vertical back stand and said at least one motor encasement;
   wherein said at least one motor is located within an interior of said at least one motor encasement;
   wherein said control panel is mounted to a flat front-face of said motor housing, said control panel able to operatively control a rotational speed of said at least one motor;
   wherein said at least one mixer shaft receiver is vertically attached to a front-bottom side of said motor housing such that said mixer shaft receiver is in communication with said motor;
   wherein said at least one mixer shaft lock is coupled to said mixer shaft receiver such that said at least one mixer shaft is able to be inserted into said mixer shaft receiver and removably locked into communication with said mixer shaft receiver;
   wherein said at least one rotary blade assembly comprising said at least one rotary blade is non-removably attached to a lower end of said at least one mixer shaft;
   wherein said drip tray is nestably located within said housing base;
   wherein said canister holder is slideably attached to said canister holder track such that said canister holder is able to be slideably raised and slideably lowered;
   wherein said canister is able to be removably coupled to said canister holder; and
   wherein said mixer assembly is useful for placing an ingredient(s) to be blended within said canister and coupling said canister with said ingredients therein to said canister holder such that said rotary blade assembly is positioned within said ingredients, and hands free blending said ingredients to produce at least one partially frozen drink;
   wherein said canister holder track comprises a vertical slot through said mixer housing such that a horizontal bar attached to said canister holder is able to attach said canister holder on an exterior of said mixer housing to a guide on said interior of said mixer housing such that said guide is able to move vertically up and vertically down within said slot.

17. The drink mixing system of claim 16, wherein said at least one canister comprises three canisters including, a blending canister, a mixing canister, and a chopping canister.

18. The drink mixing system of claim 16, wherein said at least one canister and cap member is formed from a metallic material.

19. The drink mixing system of claim 16, wherein said cap member comprises:
   two halves pivotally connected at a pivot point via a spring member;
      wherein each of said two halves includes a handle portion, such that said cap member can be pivoted by hand to an open position and placed around said mixer shaft, contact said cap sensor, and upon said upper rim of said canister, and then closed via said spring member and be frictionally retained upon said upper rim member of said canister.

20. The drink mixing system of claim 16, wherein said cap member further includes a rubber seal member connected around an inner rim thereof and adapted to form a seal between said cap member and said canister upper rim to prevent said drink from escaping said canister when said motor is activated.

* * * * *